Feb. 11, 1969  H. J. ROBERTSON  3,426,813
TOOL HANDLE WITH ROTATABLE CAPTIVE LID
Filed Nov. 13, 1967
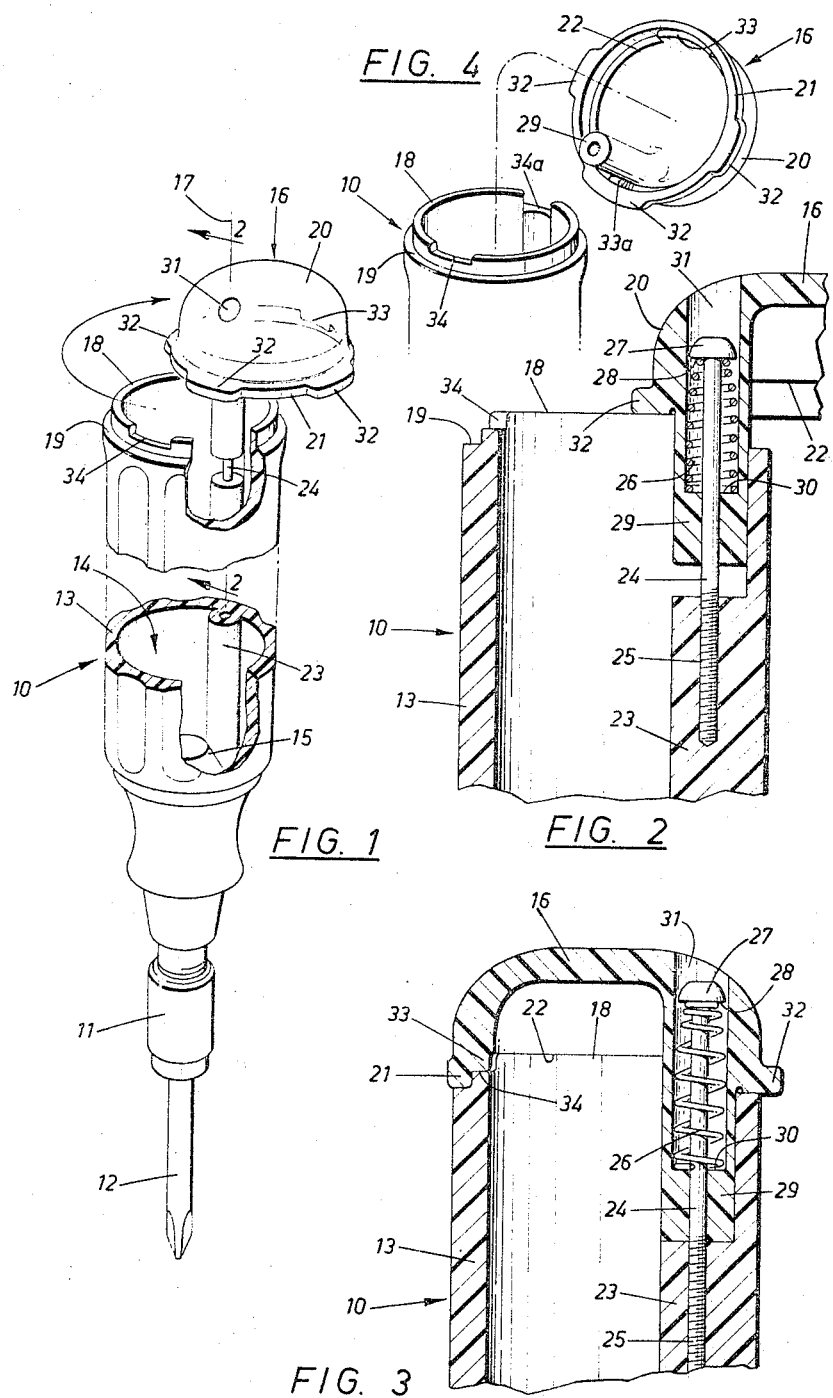
INVENTOR.
HAROLD J. ROBERTSON
BY *Frank J. Piper*
Agent

United States Patent Office 3,426,813
Patented Feb. 11, 1969

3,426,813
TOOL HANDLE WITH ROTATABLE CAPTIVE LID
Harold J. Robertson, 95 Cyprus Drive,
Kitchener, Ontario, Canada
Filed Nov. 13, 1967, Ser. No. 682,040
U.S. Cl. 145—62                    8 Claims
Int. Cl. B25q *1/08;* B65d *43/18*

ABSTRACT OF THE DISCLOSURE

A captive lid container or hollow tool handle which can contain components such as spare drill or screwdriver bits. The container lid is attached to an open end of the container in a manner which permits it to be manually rotated between open positions and a closed position. The lid is also movable in a direction substantially perpendicular to the plane of rotation thereof and is spring-biased towards the container opening. The lid and/or container are formed with restraining means which prevents rotation of the lid from its closed position to an open position unless the lid is axially moved a predetermined distance away from the opening.

---

The present invention relates generally to containers with rotatable captive lids, which containers are useful in a wide range of applications. More particularly, the invention relates to tool handles with captive caps or lids such as tool handles which can contain components such as spare drill bits, screwdriver blades, etc.

The use of hollow tool handles to contain such components is well known. It is, for instance, known to provide such handles with threaded caps which can be removed by unscrewing. Such handles have the disadvantage, however, that the cap may be accidentally unscrewed during use, particularly when the tool is being used, in the case of a conventional right-hand threaded cap, by rotation in a counterclockwise direction. A further disadvantage of such known tool handles is that, in order to remove a component from the handle compartment, it is necessary to remove the cap fully from the handle; this necessitates a further separate object, namely the cap, being held and handled by the user.

Attempts have previously been made to avoid these disadvantages. For instance, in United States patent specification No. 518,106, there is described a tool handle in which an end cap is pivoted near one side of the end of a hollow tool handle and in which a spring is provided to hold the cap against the end of the tool handle. In the aforementioned United States Patent Specification, it is also taught that such a cap may be provided with a "locking" lug or protuberance on its underside, which lug fits into a depression or "cell" in the end of the handle.

Although such an arrangement obviates the need for the user to hold a separated cap when the tool is opened, the arrangement whereby the cap is locked in its closed position has the disadvantage of allowing the cap to be accidentally moved to an open position during use of the tool.

This disadvantage is avoided in the tool handle of the present invention in which it is impossible to rotate the cap or lid from its closed position to an open position unless the lid is moved bodily a predetermined distance away from the open end of the tool handle. By the provision in accordance with the invention of such restraining means preventing accidental rotation of the lid from the closed position, the advantage to the user of not having to hold and handle a separate lid when the tool is open is retained whilst the danger of spillage of the components from the handle compartment is considerably reduced.

Accordingly, the present invention provides a container having an opening, a lid secured at said opening and rotatable in a plane parallel to the plane of the opening between open positions and a closed position, holding means interconnecting said container and said lid and exerting a force on said lid towards said container in a direction substantially perpendicular to the plane of rotation of said lid, and restraining means for preventing rotation of said lid from its closed position to an open position unless the lid is moved bodily a predetermined distance away from said opening in a direction substantially perpendicular to the plane of said opening.

It will be appreciated that the present invention embraces any container having an opening and a lid closing said opening and fitted to said container in the manner described and claimed. The invention will, for instance, find application in household containers, such as salt and pepper shakers, where a positive holding of a lid in a closed position together with ease of opening and a captive lid are required or are at least advantageous. Numerous other applications will readily be apparent.

As previously explained, an important feature of the present invention is that the lid must be bodily moved a predetermined distance away from the container opening before the lid can be rotated to an open position. This requirement can be met by the provision of a skirt surrounding the opening and protecting from the container towards the lid and of a corresponding annular recess or ledge at or near the periphery of the lid, said skirt fitting into the recess or ledge when the lid is in its closed position and said lid resting on said skirt when the lid is in an open position. Similarly, rotation of the lid from its closed position can be prevented by the provision of such a skirt on the underface of the lid and of a corresponding recess or ledge on the outer face of the container.

Alternatively or additionally, accidental rotation of the lid from its closed position can be prevented by the provision of two or more teeth projecting from the container towards the lid at or near the edge of the opening and of an equal number of corresponding notches at or near the periphery of the lid, whereby the lid may not be rotated from its closed position until all such teeth are disengaged from the notches by bodily movement of the lid away from the opening. It will be appreciated that, in the case of the handle of the aforementioned United States patent specification No. 518,106, disengagement of a single tooth/notch arrangement can accidentally occur by the cap pivoting away from one side of the handle end. Danger of such disengagement is reduced in the present invention particularly when the teeth and the corresponding notches are provided at opposite sides of the lid and opening. In general, it will be preferred to have two teeth/notch pairs and to have one of these pairs near the axis of rotation of the lid since undesired pivoting of the lid away from the opening is likely to occur about such point. The use of teeth and corresponding notches to provide the restraining means to prevent rotation of the lid from its closed position has been described with reference to the provision of teeth projecting from the container. It will, however, be understood that such teeth may be provided at the periphery of the lid and the corresponding notches formed at or near the edges of the opening in the container.

The holding means interconnecting the lid and the container can conveniently comprise a spiral spring. When such a spring is used, it is preferred to have a rod passing through the centre of the spring to maintain its axis substantially coincident with the axis of rotation of the lid. One particularly convenient arrangement has been found to comprise securing one end of such a rod within the container, providing a lip on the other end of the rod, which lip is adapted to abut one end of the spiral spring through which the rod passes, and providing the lid with a hollow projection coaxial with said rod and spring and adapted to encompass the other end of the spiral spring, said spring and rod being free to move in said hollow projection. Such an arrangement provides a satisfactory force on the lid towards the container in a direction perpendicular to the plane of rotation of the lid while reducing to a minimum undesirable movement of the lid both out of its plane of rotation and linearly within that plane with consequent danger of accidental opening of the container.

It has also proved useful to provide the lid with outer projections so that pressure may be applied thereto to move the lid bodily away from the container opening so that it may then be rotated to an open position. It is preferred for the lid to be so arranged that it will not rotate from an open position to the closed position unless an external force is applied thereto. Such free rotation will normally be prevented by the friction between the cooperating surfaces of the lid and the container.

The invention will now be described by way of illustration with reference to the accompanying drawings, in which:

FIGURE 1 is a perspective view of a tool having a handle comprising a container and lid in accordance with the invention, with the lid in an open position;

FIGURE 2 is a sectional view along the line 2—2 of FIGURE 1 with the lid in an open position; and FIGURE 3 is a sectional view similar to that of FIGURE 2 with the lid in closed position.

FIGURE 4 is a perspective view of the top portion of the handle with the lid removed and turned to show detail.

The tool shown in FIGURE 1 comprises a handle generally indicated at 10 with a chuck 11 containing a removable bit 12. The handle 10 comprises a hollow generally cylindrical body 13 having an internal compartment 14. The handle 10 is preferably constructed from a moldable, transparent plastic but other materials such as a metal may be used, if desired. The compartment 14 may conveniently be used for the stroage of spare bits for the tool.

The bottom of the compartment 14 can have a frusto-conical configuration 15 for substantially maintaining the spare bits parallel to each other. The configuration of the bottom of the handle compartment is, however, irrelevant to the scope of the present invention.

The tool handle 10 has a lid generally indicated at 16 secured to said handle 10 in a rotatable manner about an axis indicated at 17, as will be explained in greater details below.

In the embodiment illustrated, the handle 10 has at its upper end an annular upwardly extending skirt 18 inset from the periphery of the handle, thereby forming a peripheral ledge 19. The lid 16 generally comprises a hollow hemispherical shell 20 having an outer skirt 21 standing out from its base and thereby forming a ledge 22. When the lid is in the closed position, as shown in FIGURE 3, the ledge 22 of the lid 16 rests on the upper surface of the skirt 18 of the handle while the skirt 21 of the lid rests on the ledge 19 of the handle.

As previously stated, the lid 16 is secured to the handle 10 so that it is rotatable about an axis 17. In the embodiment illustrated, the handle 10 is provided on one of its internal walls with a solid internal body 23 into which there is secured in any convenient manner, for example, by means of a screw thread 25, a steel rod 24. The steel rod 24 passes through a spiral spring 26 and has, at its upper end, a dome 27 forming a lip 28 which abuts the upper end of the spring 26. The lid 16 comprises a hollow projection 29 coaxial with rod 24 and spring 26 and having a seat 30 to encompass the lower end of the spring 26. The passageway 31 in lid 16 and its projection 29 is of such a diameter that the spring 26 and the rod 24 with its upper dome 27 are free to move backwards and forwards therein. In this way, the lid 16 is rotatably secured to the handle 10.

It will be seen that, as a result of the cooperation between the skirts 18 and 21 and the ledges 19 and 22, rotation of the lid from its closed position to an open position is prevented unless the lid 16 is moved upwardly and bodily away from handle 10 against the action of spring 26 a distance at least equal to the lengths of the skirts 18 and 21.

It will also be seen that the lid 16 is maintained in this upwardly displaced position as long as it is in any position other than its closed position as the skirt 21 will be supported by the upper edge of skirt 18.

Lid 16 will not, however, freely rotate from an open position to its closed position unless an external force is applied thereto in view of the high frictional force between the opposing edges of skirts 18 and 21.

It will be seen that, in its closed position, lid 16 will be securely held in place since it cannot be rotated to an open position without an upward force being applied. This is useful since it prevents accidental rotation of the lid with consequent danger of spillage of the contents of compartment 14. On the other hand, when it is desired to remove or replace spare bits in compartment 14, it is necessary simply to lift lid 16 upwardly to disengage skirts 18 and 21 and then rotate the lid. In order to facilitate this operation, protruding flanges 32 can be provided about the periphery of lid 16. When flanges are provided, it is easy to grip the handle 10 and to lift and rotate lid 16 with one hand leaving the user's other hand free to handle the bits, etc. Flanges 32 also serve the purpose of preventing the tool from rolling when it is set down on an uneven bench or the like surface.

Alternative to or in addition to the skirt/ledge arrangement already described, an arrangement of notches and lugs may be provided further to prevent rotation of the lid 16 when subjected to torque in its closed position. Although these are not essential when the aforementioned skirts and ledges are provided, they are shown in the drawings to illustrate a suitable manner for providing an effective operation. For this purpose, lid 16 is provided with a lug 33 projecting downwardly from ledge 22, and on the opposite side a web portion 33a extending between the inner wall of skirt 21 and the outer face of lid projection 29. Lug 33 and web 33a cooperate with corresponding notches 34, 34a provided in skirt 18 (see FIGURE 4). Lug 33, and web 33a and notches 34, 34a serve to further increase the torque resistance of the lid when it is in its closed position. Also the web 33a and notch 34a serve to relieve strain on the retaining rod 24 when torque is applied to the lid.

In the case where such teeth alone are provided for locking the lid in its closed position, it is preferable to provide at least two teeth to prevent unlocking of the lid by it pivoting out of its plane of rotation. The two teeth will normally be provided opposite each other across the periphery of the lid with one tooth being located near the axis of rotation of the lid. The teeth can alternatively be provided about the periphery of the handle opening and correspond with notches in the periphery of the lid.

When the means interconnecting the lid and the handle are provided at the periphery of the lid and the retaining means comprises a pair of cooperating skirts, such as skirts 18 and 21, it is necessary, in the absence of web 33a and notch 34a to ensure that there is sufficient clearance between the projection 29 and the wall 13 for the skirt 21 to seat on ledge 19.

In the embodiment illustrated, the solid internal body 23 into which the rod 24 is secured is provided as a solid cylindrical body extending upwardly from the base of the hollow handle and is integrally formed with a both the base and the wall 13. In this manner, additional strength is provided for the interconnection of the lid with the handle. This construction is preferred in the case of handles with the relative dimensions illustrated but may of course be varied for handles of other dimensions.

It will be understood, of course, that modifications

What I claim as new and desire to protect by Letters Patent of the United States is:

1. A tool handle comprising a container having an opening, a lid secured at said opening and rotatable in a plane parallel to the plane of the opening between open positions and a closed position, holding means interconnecting said container and said lid and exerting a force on said lid towards said container in a direction substantially perpendicular to the plane of rotation of said lid, restraining means for preventing rotation of said lid from its closed position to an open position unless the lid is moved bodily a predetermined distance away from said opening in a direction substantially perpendicular to the plane of said opening, and spacing means to maintain said lid said predetermined distance away from said opening when said lid is in an open position, said restraining means comprising (a) an annular skirt projecting from the periphery of said lid towards said container and (b) a corresponding recess or ledge at or near the periphery of the opening, said skirt fitting into said recess or ledge only when the lid is in its closed position, and said lid being prevented by the friction between the cooperating surfaces of the lid and the container from rotating from an open position to its closed position unless an external force is applied thereto.

2. A tool handle as claimed in claim 1 in which said holding means comprises a spiral spring connected to both the lid and the container and having its axis substantially coincident with the axis of rotation of the lid.

3. A tool handle as claimed in claim 1 in which said spiral spring has a rod passing through its centre, said rod serving to maintain the axis of the spring substantially coincident with the axis of rotation of the lid.

4. A tool handle as claimed in claim 3 in which one end of said rod is secured within said container, in which the other end of said rod has a lip adapted to abut one end of the spiral spring through which the rod passes, and in which the lid is provided with a hollow projection coaxial with said rod and spring and which is adapted to encompass the other end of the spring, said spring and rod being free to move in said hollow projection.

5. A tool handle as claimed in claim 5 in which the restraining means additionally comprises at least two notches at or near the edge of the opening and an equal number of corresponding teeth at or near the periphery of said lid, whereby said lid cannot be rotated from its closed position until said teeth are disengaged from said notches by said bodily movement of said lid.

6. A tool handle as claimed in claim 5 in which the lid is prevented by the friction between the cooperating surfaces of the lid and the container from rotating from an open position to its closed position unless an external force is applied thereto.

7. A tool handle as claimed in claim 4 in which the rod forming part of said holding means is secured in a solid body extending in a direction substantially perpendicular to the plane of the opening and away from said opening to the opposite wall or base of the container with which it is integrally formed.

8. A tool handle as claimed in claim 7 in which said solid body is integrally formed with both said base of the container and with a side wall extending away from said base towards said opening.

References Cited

UNITED STATES PATENTS

| 267,060 | 11/1882 | Buell | 145—62 |
|---|---|---|---|
| 2,396,932 | 3/1946 | Slaton et al. | 220—33 |

GEORGE T. HALL, *Primary Examiner.*

U.S. Cl. X.R.

220—33, 35; 16—110.5